(12) United States Patent
Franko, Jr.

(10) Patent No.: US 10,497,288 B2
(45) Date of Patent: Dec. 3, 2019

(54) LABELS AND THEIR MANUFACTURING METHODS

(71) Applicant: Quality Assured Enterprises, Inc., Hopkins, MN (US)

(72) Inventor: Joseph D. Franko, Jr., Hopkins, MN (US)

(73) Assignee: QUALITY ASSURED ENTERPRISES, INC., New Hope, MN (US)

( * ) Notice: Subject to any disclaimer, the term of this patent is extended or adjusted under 35 U.S.C. 154(b) by 620 days.

(21) Appl. No.: 14/783,961

(22) PCT Filed: Apr. 16, 2014

(86) PCT No.: PCT/US2014/034379
§ 371 (c)(1),
(2) Date: Oct. 12, 2015

(87) PCT Pub. No.: WO2014/193555
PCT Pub. Date: Dec. 4, 2014

(65) Prior Publication Data
US 2016/0049100 A1 Feb. 18, 2016

Related U.S. Application Data

(60) Provisional application No. 61/816,678, filed on Apr. 26, 2013.

(51) Int. Cl.
*B32B 3/24* (2006.01)
*G09F 3/02* (2006.01)
(Continued)

(52) U.S. Cl.
CPC .............. *G09F 3/02* (2013.01); *B31D 1/021* (2013.01); *B31D 1/026* (2013.01); *B32B 7/05* (2019.01);
(Continued)

(58) Field of Classification Search
CPC ........................................................ G09F 3/02
See application file for complete search history.

(56) References Cited

U.S. PATENT DOCUMENTS 3,779,829 A   12/1973   Wolff
3,865,671 A   2/1975   Kronsder
(Continued)

FOREIGN PATENT DOCUMENTS

EP   1302333 A2   4/2003
EP   1473245 A1   11/2004
(Continued)

OTHER PUBLICATIONS

International Preliminary Report on Patentability for PCT/US2011/055194 dated Apr. 18, 2013.
(Continued)

*Primary Examiner* — William P Watkins, III
(74) *Attorney, Agent, or Firm* — Walter K. Roloff; Gerald E. Helget; Briggs and Morgan, P.A.

(57) ABSTRACT

A label is constructed from a roll-fed label web. The label web includes a base ply that is selectively joined to a top ply by way of a bonding agent in selected locations between the plies. Cuts are provided through the top ply and the base ply where the bonding agent resides between the plies and in separate locations laterally along the plies such that a cut through the top ply does not align with a cut in the base ply. Sequential cuts are then provided at point of application, together through both the top ply and the base ply and the bonding agent. The sequential cuts are located where the bonding agent resides between the plies and in separate locations laterally along the plies such that the sequential cuts do not align with cuts in the top ply or with cuts in the base ply. Portions of the top ply and portions of the base ply are each defined by respective cuts in the top ply and base ply, and remain adhered to an overall structure of the roll-fed (Continued)

label web. The label produced from the roll-fed label web at point of application may be manipulated to achieve a desired effect.

2 Claims, 13 Drawing Sheets

(51) Int. Cl.
  *B32B 7/05* (2019.01)
  *G09F 3/10* (2006.01)
  *B31D 1/02* (2006.01)

(52) U.S. Cl.
  CPC ............ *G09F 3/10* (2013.01); *B32B 2519/00* (2013.01); *G09F 2003/0222* (2013.01); *G09F 2003/0264* (2013.01); *G09F 2003/0273* (2013.01)

(56) References Cited

U.S. PATENT DOCUMENTS

| | | |
|---|---|---|
| 4,473,429 A | 9/1984 | Crankshaw |
| 4,518,450 A | 5/1985 | Warmann |
| 4,533,586 A | 8/1985 | Roule et al. |
| 4,589,943 A | 5/1986 | Kimball et al. |
| 4,632,721 A | 12/1986 | Hoffmann et al. |
| 4,680,080 A | 7/1987 | Instance |
| 4,700,976 A | 10/1987 | Loose |
| 4,727,667 A | 3/1988 | Ingle |
| 5,017,261 A | 5/1991 | Zodrow et al. |
| 5,048,870 A | 9/1991 | Mangini et al. |
| 5,062,917 A | 11/1991 | Zodrow |
| 5,078,826 A | 1/1992 | Rogall |
| 5,215,622 A | 6/1993 | Schmelzer |
| 5,263,743 A | 11/1993 | Jones |
| 5,370,754 A | 12/1994 | Soloman |
| 5,405,482 A | 4/1995 | Morrissette et al. |
| 5,462,488 A | 10/1995 | McKillip |
| 5,605,730 A | 2/1997 | Treleaven |
| 5,727,819 A | 3/1998 | Grosskopf et al. |
| 5,738,382 A | 4/1998 | Grosskopf et al. |
| 5,741,381 A | 4/1998 | Dolence et al. |
| 5,829,789 A | 11/1998 | Treleaven et al. |
| 5,830,550 A | 11/1998 | Treleaven et al. |
| 5,863,628 A | 1/1999 | Barry |
| 5,975,582 A | 11/1999 | Treleaven |
| 6,027,780 A | 2/2000 | Treleaven et al. |
| 6,035,568 A | 3/2000 | Grosskopf et al. |
| 6,048,423 A | 4/2000 | Barrash et al. |
| 6,057,019 A | 5/2000 | Barry |
| 6,086,697 A | 7/2000 | Key |
| 6,120,637 A | 9/2000 | Barry |
| 6,213,520 B1 | 4/2001 | Treleaven et al. |
| 6,237,269 B1 | 5/2001 | Key |
| 6,270,121 B1 | 8/2001 | Dolan et al. |
| 6,274,236 B1 | 8/2001 | Shacklett et al. |
| 6,328,832 B1 | 12/2001 | Otruba et al. |
| 6,329,034 B1 | 12/2001 | Pendry et al. |
| 6,332,631 B1 | 12/2001 | Kirk |
| 6,398,263 B2 | 6/2002 | Treleaven et al. |
| 6,402,872 B1 | 6/2002 | Key |
| 6,413,345 B1 | 7/2002 | Treleaven |
| 6,428,639 B1 | 8/2002 | Oldenburg et al. |
| 6,431,231 B1 | 8/2002 | Braaten et al. |
| 6,550,171 B1 | 4/2003 | De Werra et al. |
| 6,550,512 B2 | 4/2003 | Yang |
| 6,561,246 B2 | 5/2003 | Yang |
| 6,575,216 B2 | 6/2003 | Yang |
| 6,598,608 B1 | 7/2003 | Downey |
| 6,616,189 B2 | 9/2003 | Raming |
| 6,631,578 B2 | 10/2003 | Key |
| 6,669,804 B2 | 12/2003 | Pendry et al. |
| 6,737,137 B2 | 5/2004 | Franko, Sr. et al. |
| 6,752,431 B1 | 6/2004 | Matthews et al. |
| 6,755,442 B2 | 6/2004 | Franko, Sr. et al. |
| 6,786,515 B2 | 9/2004 | Franko, Sr. |
| 6,793,755 B2 | 9/2004 | Schaupp et al. |
| 6,811,640 B2 | 11/2004 | Franko, Sr. |
| 7,087,298 B2 | 8/2006 | Key |
| 7,172,220 B2 | 2/2007 | Franko, Sr. |
| 7,172,668 B2 | 2/2007 | Key |
| 7,179,514 B2 | 2/2007 | Olsen et al. |
| 7,448,163 B2 | 11/2008 | Maliner et al. |
| 7,601,410 B2 * | 10/2009 | Matthews ............... B65C 3/163 428/343 |
| 7,871,479 B2 | 1/2011 | Garland |
| 7,875,142 B2 | 1/2011 | Matthews et al. |
| 7,926,851 B2 | 4/2011 | Kaufman |
| 8,043,993 B2 | 10/2011 | Roth et al. |
| 8,142,596 B1 | 3/2012 | Valenti, Jr. et al. |
| 8,245,752 B2 | 8/2012 | Lingier et al. |
| 2001/0004152 A1 | 6/2001 | Treleaven et al. |
| 2001/0017181 A1 | 8/2001 | Otruba et al. |
| 2001/0025442 A1 | 10/2001 | Key |
| 2001/0045741 A1 | 11/2001 | Shacklett et al. |
| 2001/0052386 A1 | 12/2001 | Treleaven et al. |
| 2002/0015813 A1 | 2/2002 | Pendry et al. |
| 2002/0017784 A1 | 2/2002 | Merry et al. |
| 2002/0038685 A1 | 4/2002 | Key |
| 2002/0096261 A1 | 7/2002 | Yang |
| 2002/0096262 A1 | 7/2002 | Yang |
| 2002/0096264 A1 | 7/2002 | Yang |
| 2002/0130182 A1 | 9/2002 | Mondie |
| 2002/0171238 A1 | 11/2002 | Kozlowski et al. |
| 2002/0185212 A1 | 12/2002 | Schaupp et al. |
| 2002/0193225 A1 | 12/2002 | Raming |
| 2003/0006606 A1 | 1/2003 | Franko, Sr. et al. |
| 2003/0015105 A1 | 1/2003 | Dewig et al. |
| 2003/0017293 A1 | 1/2003 | Franko |
| 2003/0030270 A1 | 2/2003 | Franko, Sr. et al. |
| 2003/0091819 A1 | 5/2003 | Franko, Sr. |
| 2003/0118768 A1 | 6/2003 | Sellars |
| 2003/0175463 A1 | 9/2003 | Olsen et al. |
| 2003/0189490 A1 | 10/2003 | Hogerton et al. |
| 2004/0108055 A1 | 6/2004 | Franko |
| 2004/0123565 A1 | 7/2004 | Rice et al. |
| 2004/0166277 A1 | 8/2004 | Key |
| 2004/0197513 A1 | 10/2004 | Shacklett et al. |
| 2004/0207193 A1 | 10/2004 | Franko, Sr. |
| 2004/0244242 A1 | 12/2004 | Maliner et al. |
| 2005/0076549 A1 | 4/2005 | Sellars |
| 2005/0181165 A1 | 8/2005 | Franko, Sr. |
| 2005/0190914 A1 | 9/2005 | Chen et al. |
| 2006/0029761 A1 | 2/2006 | Matthews et al. |
| 2006/0078701 A1 | 4/2006 | Glasier |
| 2006/0134365 A1 | 6/2006 | Blank et al. |
| 2006/0145471 A1 | 7/2006 | Franko, Sr. |
| 2007/0034103 A1 | 2/2007 | Kaufman |
| 2007/0209753 A1 | 9/2007 | Gonzalez et al. |
| 2007/0209755 A1 | 9/2007 | Smith |
| 2007/0213214 A1 | 9/2007 | Roth et al. |
| 2007/0221319 A1 | 9/2007 | Morgan |
| 2007/0252379 A1 | 11/2007 | Bethune et al. |
| 2008/0003391 A1 | 1/2008 | Franko et al. |
| 2008/0003410 A1 | 1/2008 | Shacklett et al. |
| 2008/0014344 A1 | 1/2008 | Fort et al. |
| 2008/0073902 A1 | 3/2008 | Franko |
| 2008/0236733 A1 | 10/2008 | Hudetz |
| 2008/0303264 A1 | 12/2008 | Kaufman |
| 2008/0303265 A1 | 12/2008 | Kaufman |
| 2009/0236023 A1 | 9/2009 | Lingier et al. |
| 2009/0255623 A1 | 10/2009 | Bagung et al. |
| 2010/0010681 A1 | 1/2010 | Zugibe et al. |
| 2010/0044438 A1 | 2/2010 | Chen et al. |
| 2010/0084077 A1 | 4/2010 | Matthews et al. |
| 2010/0240133 A1 | 9/2010 | Brivanlou et al. |
| 2010/0295916 A1 | 11/2010 | Kaufman |
| 2010/0300599 A1 | 12/2010 | Fort et al. |
| 2010/0307947 A1 | 12/2010 | Marden et al. |
| 2011/0052850 A1 | 3/2011 | Seidl |
| 2011/0151115 A1 | 6/2011 | Lingier |
| 2011/0233095 A1 | 9/2011 | Seidl |
| 2012/0037299 A1 | 2/2012 | Baeta et al. |

(56) References Cited

U.S. PATENT DOCUMENTS

2012/0125526 A1    5/2012  Key
2012/0268837 A1  10/2012  Rittenburg et al.
2012/0279632 A1  11/2012  Lingier et al.
2013/0319604 A1  12/2013  DeLise, Jr.

FOREIGN PATENT DOCUMENTS

WO     WO9716109     5/1997
WO     WO98/43226 A1  10/1998
WO     WO0179372 A2  10/2001
WO     WO02/096331 A2  12/2002
WO     WO2005048220 A1  5/2006
WO     WO2011088029 A1  7/2011

OTHER PUBLICATIONS

Search Report and Written Opinion for PCT/US2011/020804 dated May 3, 2011.
Search Report and Written Opinion for PCT/US2011/021521 dated May 3, 2011.
Search Report and Written Opinion for PCT/US2011/058600 dated Apr. 5, 2012.
Search Report and Written Opinion for PCT/US2014/034379 dated Aug. 28, 2014.
Search Report and Written Opinion for PCT/US2013/050643 dated Dec. 13, 2013.

\* cited by examiner

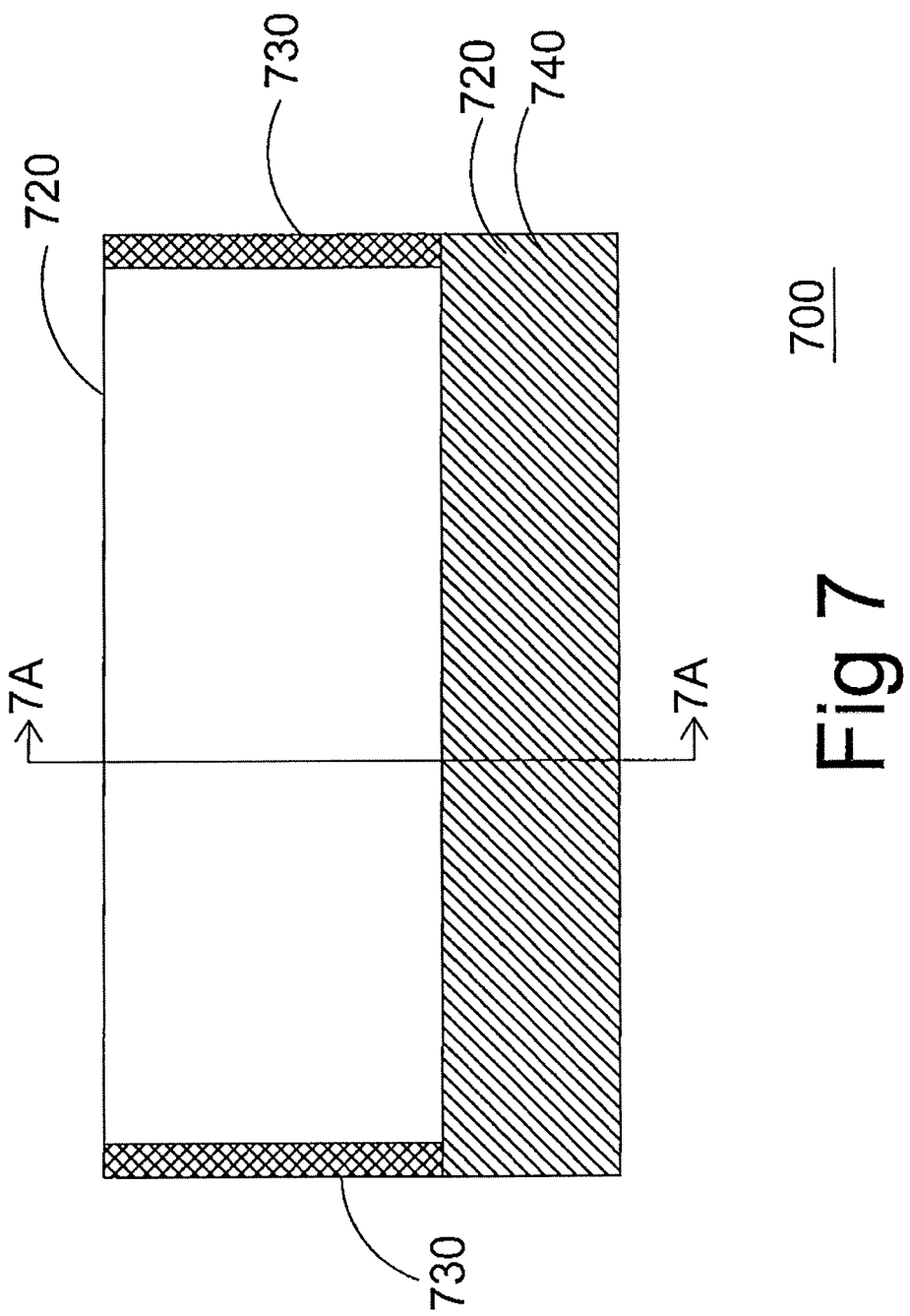

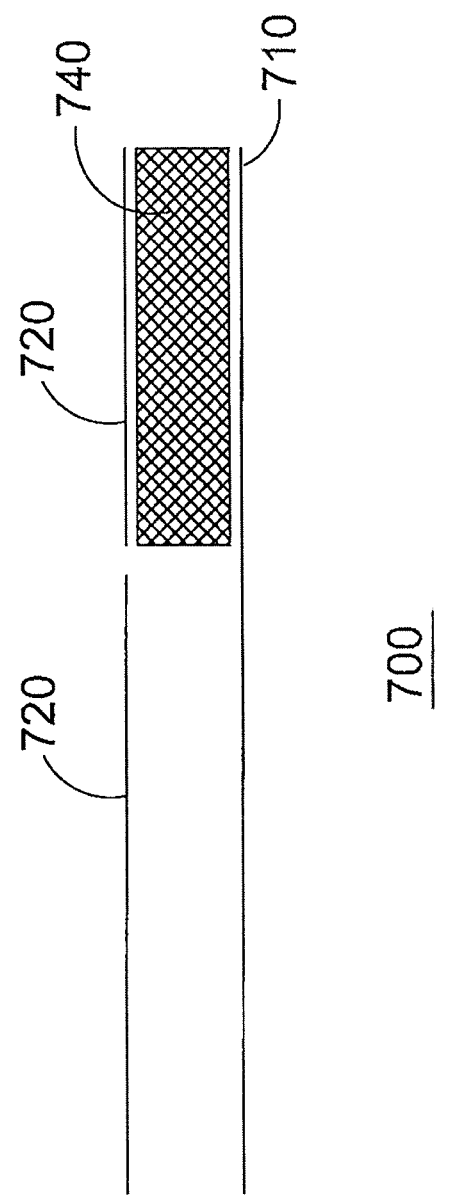

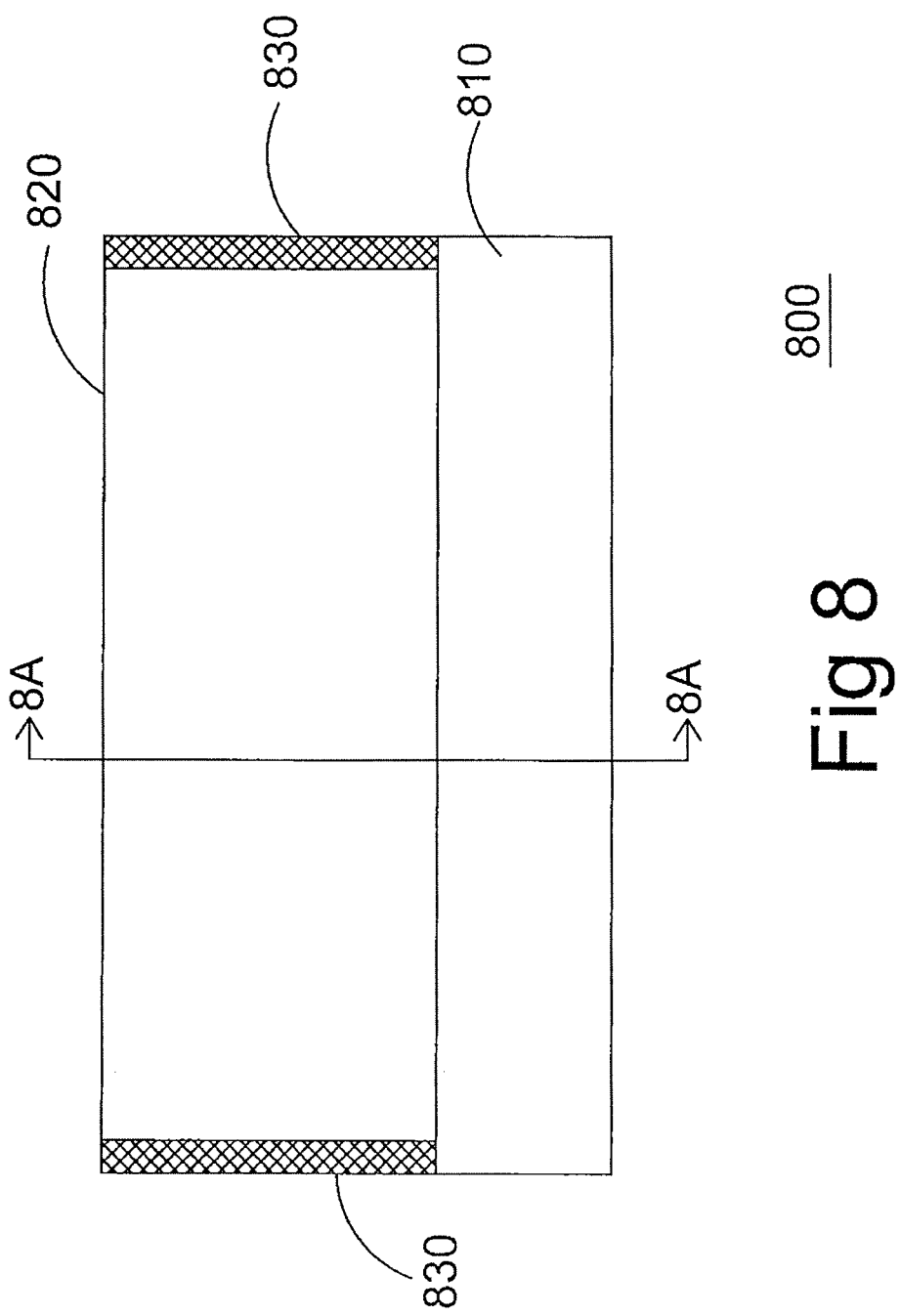

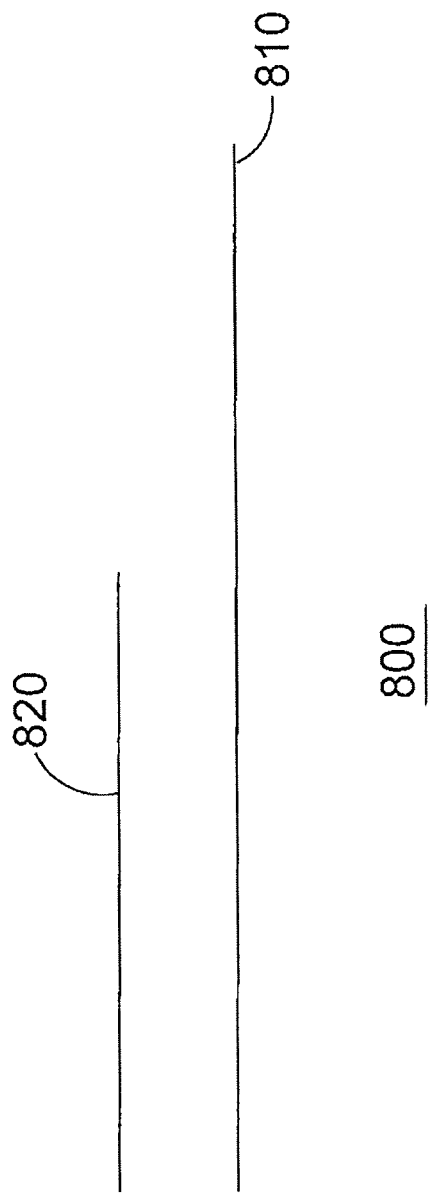

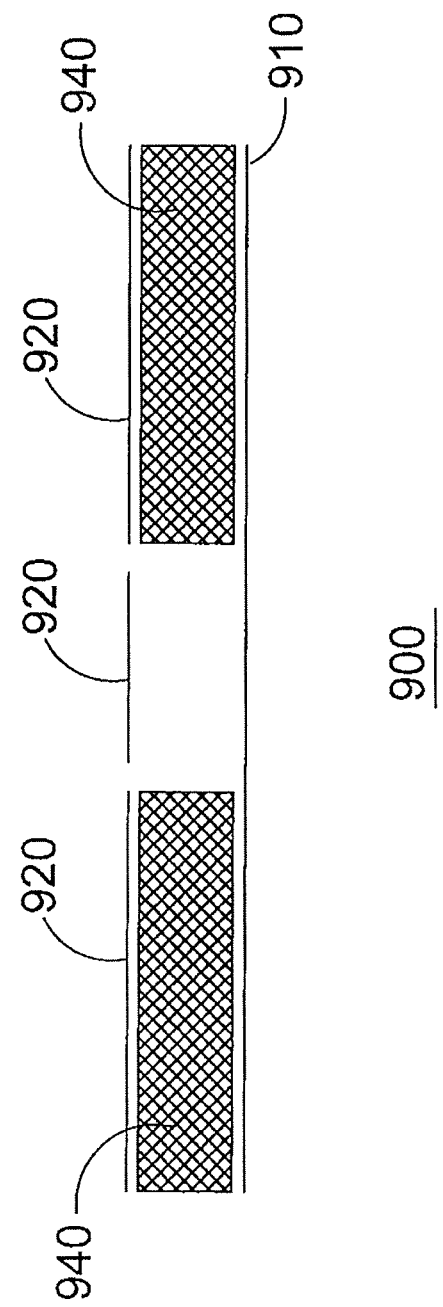

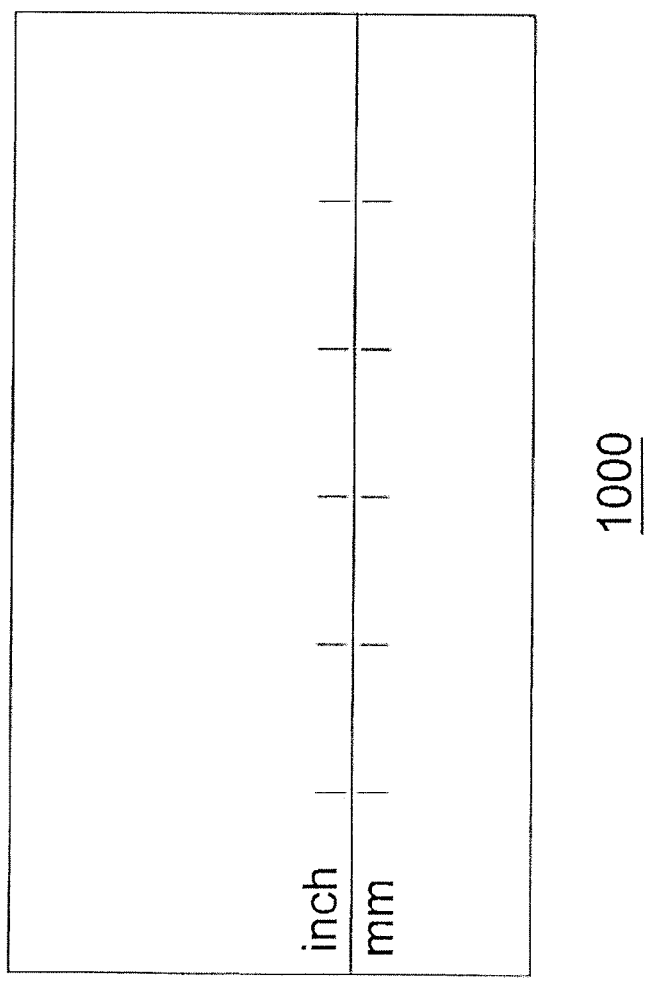

LABELS AND THEIR MANUFACTURING METHODS

TECHNICAL FIELD

This disclosure relates generally to labels. More particularly, this disclosure relates to labels and their manufacturing methods.

BACKGROUND

In the printing arts, and in particular in the printed label art for labeling and decorating objects, there exists a continual demand for labels and decorations which not only appeal to consumers, but also bear ever increasing amounts of information. For example, labels for identification of health care and pharmaceutical products are often required by governmental regulations to describe in painstaking detail their compositions and ingredients. As new food and drug laws are passed, regulations require the inclusion of increasing amounts of label information. As another example, labels for identification of agricultural and industrial products are similarly required by governmental regulations to describe their compositions and ingredients by way of, e.g., "material safety data sheets" and the like. Additionally, there is a demand for labels and decorations which appeal to consumers by way of their function or appearance, such as labels which may, for example, be manipulated by a consumer to achieve a desired effect. Such desired effects could include, for example, movement of a portion, portions, or an entirety of the label, or a viewing port, or any other effects or combinations thereof. It would also be advantageous for such labels to be able to be provided without modification of existing equipment and/or machines for label manufacturing and/or label application.

Therefore, there exists a need for labels that do not require modification of existing equipment and/or machines for label manufacturing and/or label application, and that do not require significant changes to label ply materials, adhesive materials in manufacturing and/or at point of application, or other labeling and/or label application components. There also exists a need for labels that satisfactorily function when applied to a container such as, for example, a recyclable beverage bottle or an aerosol spray can.

SUMMARY

This disclosure describes novel labels that do not require modification of existing equipment and/or machines for label manufacturing and/or label application, for creation of label webs and individual labels and also for application of the labels to objects to be labeled.

In an embodiment, a label is constructed from a roll-fed label web. The label web includes a base ply that is selectively joined to a top ply by way of a bonding agent in selected locations between the plies. Cuts are provided through the top ply and the base ply where the bonding agent resides between the plies and in separate locations laterally along the plies such that a cut through the top ply does not align with a cut in the base ply. Sequential cuts are then provided at point of application, together through both the top ply and the base ply and the bonding agent. The sequential cuts are located where the bonding agent resides between the plies and in separate locations laterally along the plies such that the sequential cuts do not align with cuts in the top ply or with cuts in the base ply. Portions of the top ply and portions of the base ply are each defined by respective cuts in the top ply and base ply, and remain adhered to an overall structure of the roll-fed label web. The label produced from the roll-fed label web at point of application may be manipulated to achieve a desired effect.

In another embodiment, a label is constructed from a roll-fed label web. The label web includes a base ply that is selectively joined to a top ply by way of a bonding agent in selected locations between the plies. Cuts are provided through the top ply and the base ply where the bonding agent resides between the plies and in separate locations laterally along the plies such that a cut through the top ply does not align with a cut in the base ply. Sequential cuts are then provided at point of application, together through both the top ply and the base ply and the bonding agent. The sequential cuts are located where the bonding agent resides between the plies and in separate locations laterally along the plies such that the sequential cuts do not align with cuts in the top ply or with cuts in the base ply. Portions of the top ply and portions of the base ply are each defined by respective cuts in the top ply and base ply, and remain adhered to an overall structure of the roll-fed label web. The label produced from the roll-fed label web at point of application may be manipulated to achieve a desired effect. The desired effect includes shifting of a selected ply circumferentially around a container to which the label is applied.

BRIEF DESCRIPTION OF THE DRAWINGS

FIG. 7 is a schematic top view of another example of an individual label produced according to subject matter hereof.

FIG. 7A is a schematic cross-sectional view of the example of a label viewed along line 7A-7A in FIG. 7.

FIG. 8 is a schematic top view of another example of an individual label produced according to subject matter hereof.

FIG. 8A is a schematic cross-sectional view of the example of a label viewed along line 8A-8A in FIG. 8.

FIG. 9A is a schematic cross-sectional view of the example of a label viewed along line 9A-9A in FIG. 9.

FIG. 10 is a schematic illustration of an example of a tool provided by a label according to subject matter hereof.

DETAILED DESCRIPTION

Figure 1:
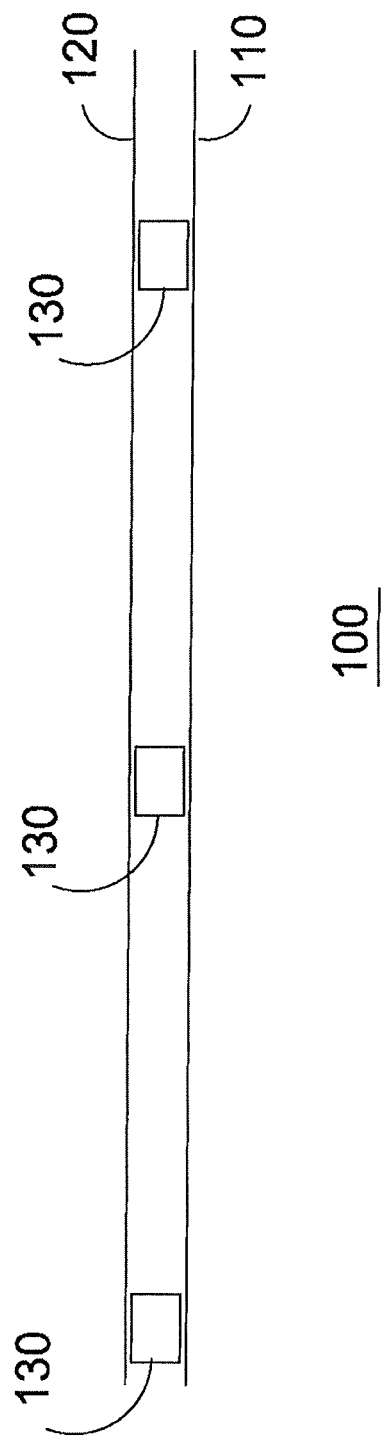
FIG. 1 is a schematic side view of an example of a portion of a label web in manufacturing according to subject matter hereof.

Referring now to FIG. 1, therein illustrated schematically in a side view is an example of a portion of a label web 100 in manufacturing labels according to subject matter hereof. It is to be noted that throughout this disclosure, a side view is generally transverse, or perpendicular, to a major lengthwise or "machine direction" of the web as understood by those of skill in the label art; and an end view (if shown) would be generally in alignment with, or parallel to, a major lengthwise or "machine direction" of the web as understood by those of skill in the label art. In this example, label web 100 comprises a so-called "roll-fed" label web construction. As known to those of skill in the labeling and packaging arts, a roll-fed label web commonly utilizes a continuous label substrate or base ply comprising paper, or a clear or opaque film such as polypropylene, or a combination of paper and film. In an individual label, in its final state created from the label web, the base ply is usually rectangular, as defined by a desired label width associated with a widthwise dimension and a desired label length associated with a lengthwise dimension (transverse to the widthwise dimension). The base ply has opposing first and second ends, along with front and back surfaces. Desired graphics and/or coatings are typically printed or otherwise provided on the front surface of the base ply, and may also be printed or otherwise provided on the back surface. As will be described in application of an individual roll-fed label to an object to be labeled, e.g., a cylindrical container, a widthwise portion of the back surface of the base ply at the first end thereof is adhered to the container by means of a separately supplied adhesive material at point of application from labeling equipment. The base ply, having been adhesively secured to the container at the first end, is then placed in circumferential fashion around the container and adhesively secured at the second end of the base ply adjacent to the first end. The length of the base ply is usually chosen to approximate a circumference of the container, to minimize excessive overlap of the opposing ends of the label substrate applied to the container. The application of the label to the container may be carried out by any suitable roll-fed label applicator such as those available from, e.g., Krones A. G. of Regensburg, Germany, and B&H Labeling Systems of Ceres, Calif., U.S.A.

Roll-fed labels of the type described herein are manufactured for application by customers using conventional roll-fed labeling equipment or machines. Presently, they are typically produced without any adhesive material on the back surface of the base ply; and as such they are provided in roll form as a web. Typically, at point of application, a web of labels in roll form is introduced to a label application machine which cuts the web into individual labels and applies them to objects to be labeled (e.g., containers). Any adhesive material used to apply the labels to the objects typically is supplied, presently, by the label application machine at the point of application and is generally applied to adhere the leading and trailing edge portions of the labels.

Although this disclosure primarily describes roll-fed label constructions, it is to be appreciated and understood that so-called "cut-and-stack" label constructions might be successfully utilized by employing manufacturing and application processes that may be analogous to those described by example herein.

Referring again to FIG. 1, in this example a base ply 110 as aforedescribed is selectively adhered or joined to a top ply 120 by way of, for example, a suitable bonding agent or material 130. As described throughout this disclosure, the term "top ply" refers to any ply above the base ply in the label structures and of which there may be more than one. The base ply has a first lengthwise dimension, a first widthwise dimension, a front surface that is capable of bearing graphic images and coatings, and—in a roll-fed construction—a back surface that is free of any bonding agent or material, and that is also capable of bearing graphic images and coatings, and that is further capable of being coupled to an object to be labeled using separately supplied adhesive material at point of application. The top ply has a second lengthwise dimension, a second widthwise dimension, a front surface that is capable of bearing graphic images and coatings, and a back surface that is also capable of bearing graphic images and coatings. The base ply and the top ply are coupled, in a first portion of the label, to each other such that the front surface of the base ply and the back surface of the top ply are preferably, but not necessarily, in contiguous juxtaposition with each other along the first lengthwise dimension and the second lengthwise dimension, respectively, and along the first widthwise dimension and the second widthwise dimension, respectively. As indicated above, when a roll-fed label web is manufactured and then introduced to a label application machine—prior to formation of individual labels from the web for application to objects of interest to be labeled—the back surface of the base ply of the web typically is, presently, free of any bonding agent or material. In this state, it can then be supplied as a continuous web in roll form to a conventional roll-fed label application machine.

Base plies and top plies according to subject matter hereof could preferably be any commercially available web-like materials that are capable of use with in-line printing and converting processes. Such materials could include, for example, polypropylene as is commercially available from AET Films of Terre Haute, Ind., in the U.S. As used herein, the term "web-like materials" is intended to include any suitable label materials, including paper, film, polypropylene, polyethylene, polyester, polyvinylchloride, polystyrene, foil, and ethylene vinyl acetate. The plies selectively could, individually or collectively, comprise so-called "shrink promoting" materials to conform to several or irregular curvatures of objects to which they are applied. Such materials include, but are not limited to, those that exhibit desired stretch and shrinkage characteristics such as are commercially available and known to those skilled in the art.

It is to be understood that any ply in a label pertaining to subject matter hereof—as described by example or otherwise contemplated herein—may be a single ply of material, whether coated or uncoated, a so-called clear protective laminate construction, or any laminated, combined ply, or co-extruded construction. Thus, it is to be appreciated and understood that examples of plies could comprise any desired combinations of coated or uncoated single plies, clear protective laminates, or any other laminated, combined ply, or co-extruded constructions. Furthermore, any desired combinations of clear plies or coatings and opaque coatings, whether in selected portions or fully in "flood coat" fashion, may be utilized.

It is also to be appreciated and understood that any suitable means of bonding selected portions of label plies together could be utilized, in construction of various embodiments of a label as described by example or otherwise contemplated herein. For example, bonding agents or materials could preferably be chosen from commercially available water-based, solvent-based, pressure-sensitive, ultraviolet light (UV) activated, electron beam (EB) activated, cold seal, heat seal, cohesive, and hot melt coatings and glues. The bonding agents or materials, which may be either (i) tacky in a final state (e.g., pressure-sensitive) or (ii) non-tacky in a final state, are preferably chosen to provide bonding between the base plies and the top plies in labels described by example or otherwise contemplated herein. Alternatively, the aforementioned bonding of selected portions of label plies together could be achieved by selected physical mating or bonding. In an example of physical bonding, a label web could be passed through a male-female pinch roller assembly to create mating deformation and thus mechanical interlocking of the plies. In another example of physical bonding, heat may be used to bond the plies by way of a thermal interlocking reaction. In yet another example, physical bonding of the plies could be achieved by sonically sealing them together in a process commonly termed "sonic welding". It is to be appreciated and understood that this physical bonding may be achieved without a need for any bonding agent or material within the label, between the plies; but in some circumstances it may be desirable to utilize both a traditional bonding agent or material between the plies and physical bonding of the plies.

Figure 2:
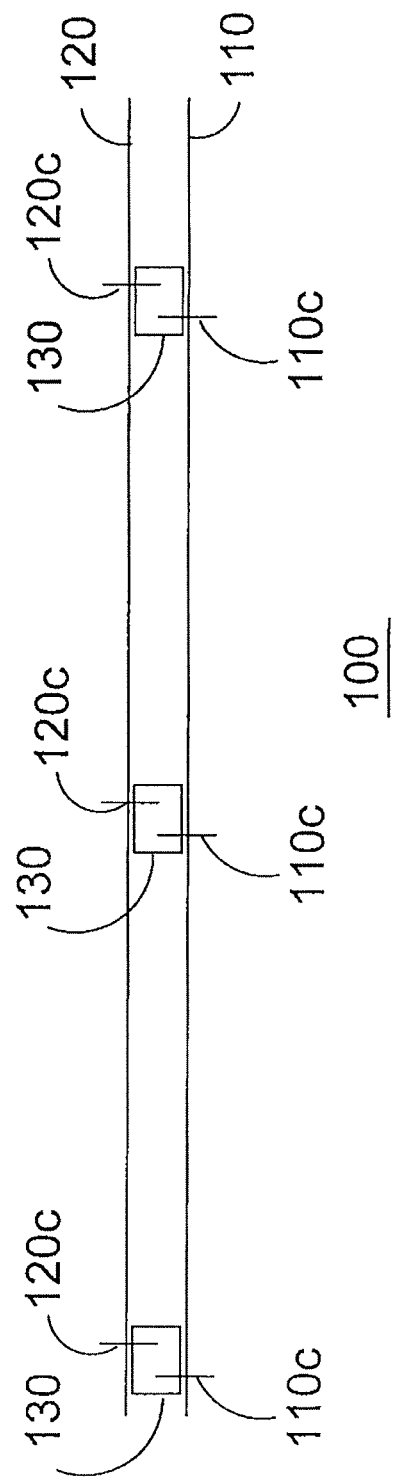
FIG. 2 is a schematic side view of the example of a portion of a label web of FIG. 1, in a further manufacturing process.

In FIG. 2, the example of the portion of label web 100 is schematically shown undergoing a further manufacturing process according to subject matter hereof. In particular, in this example plies 110 and 120 are cut fully therethrough as indicated by pairs of lines 110C and 120C (cuts 110C and 120C). It is to be appreciated and understood that as used throughout this disclosure, the term "cut" refers to any suitable cut, slit, perforation, score, break, or similar effect. Such cutting or other severing of material could be provided by use of, for example, a steel knife, a heating element, a laser, a die-cutting process, or a printed instruction to an end-user to use a cutting implement. Although cuts 110C and 120C are illustrated as being in pairs and approximately symmetrical about each area of deposition of bonding agent or material 130, it is to be appreciated and understood that cuts 110C and 120O could be made in any suitable areas provided that they occur (i) where bonding agent or material resides between the plies and (ii) at separate locations laterally along the plies (as shown in the drawings). Stated another way, cuts 110C and 120C should not be made (i) where bonding agent or material does not reside between the plies nor (ii) at the same locations laterally along the plies (i.e., with respect to the drawings, not in vertical alignment with each other).

Figure 3:
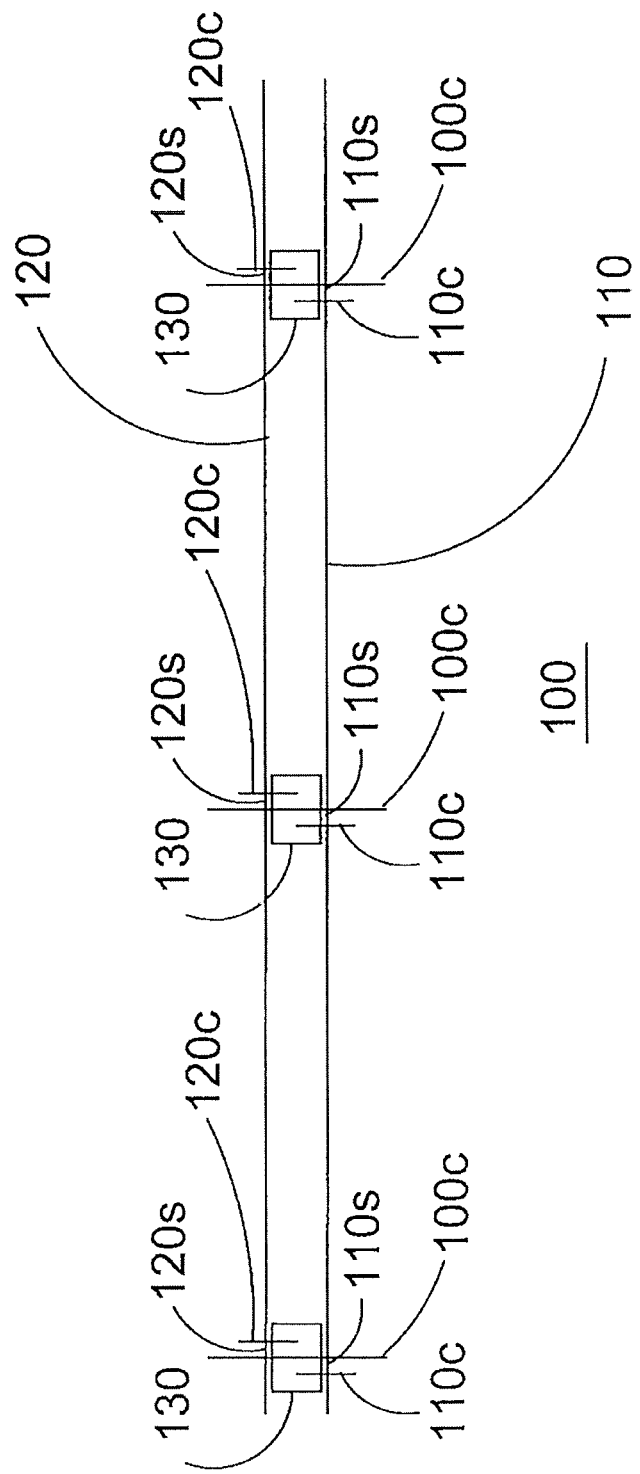
FIG. 3 is a schematic side view of the example of a portion of a label web of FIG. 2, in a label application process.

In FIG. 3, the example of the portion of label web 100 is schematically shown undergoing point-of-application processing according to subject matter hereof by way of, for example, a roll-fed label application machine (not illustrated) into which label web 100 has been fed or introduced. As known in the art, a roll-fed label application machine could be, for example, an aforementioned Krones or B&H machine. In particular, in this example web 100 is sequentially cut fully through plies 110 and 120, and through bonding agent or material 130, as indicated by lines 100C (cuts 100C). Although cuts 100C are illustrated as being approximately symmetrical relative to each pair of cuts 110C and 120C, it is to be appreciated and understood that cuts 100C could be made in any suitable areas provided that they occur (i) where bonding agent or material resides between the plies and (ii) between each pair of cuts 110C and 120C laterally along the plies (as shown in the drawings). Stated another way, cuts 100C should not be made (i) where bonding agent or material does not reside between the plies nor (ii) at a location laterally along the plies where a cut 110C or 120C already exists (i.e., with respect to the drawings, not in vertical alignment with a cut 110C or 120C). It is to be appreciated and understood that in this example of FIG. 3, label web 100 includes portions 110S and 120S of plies 110 and 120, respectively, that are defined by respective cuts 110C and 120C. These portions 110S and 120S of the plies remain adhered to the overall structure of label web 100. Such a configuration is advantageous for individual labels produced from the web which may, for example, be manipulated by a consumer to achieve a desired effect as will be described.

Figure 4:
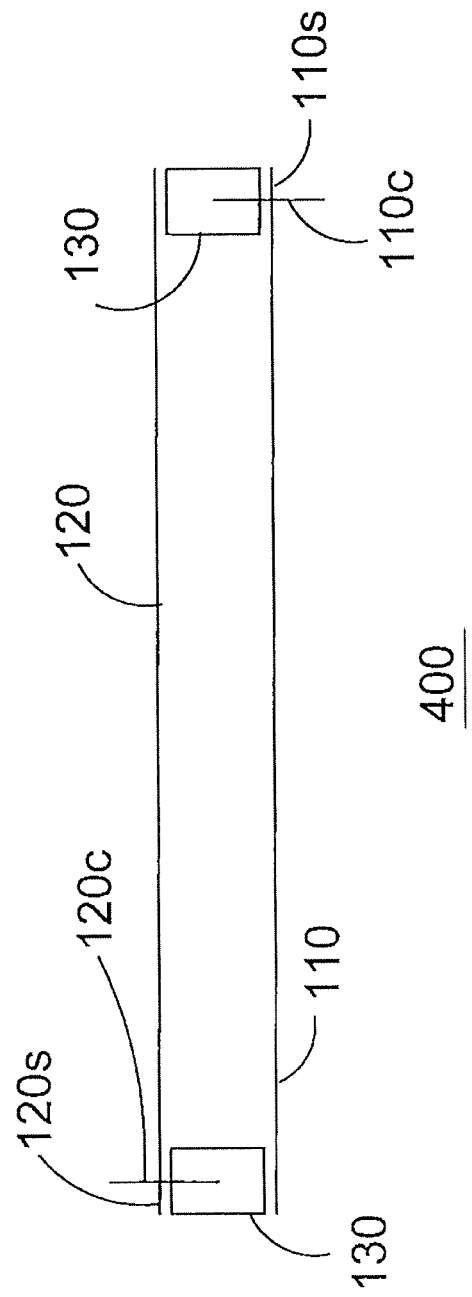
FIG. 4 is a schematic side view of an example of an individual label, cut from the web of FIG. 3.

In FIG. 4, an example of an individual label 400 is schematically depicted as having been created at point of application from the example of the portion of label web 100 after having been cut (at locations 100C in FIG. 3) by a roll-fed label application machine (not illustrated) as aforementioned.

Figure 5:
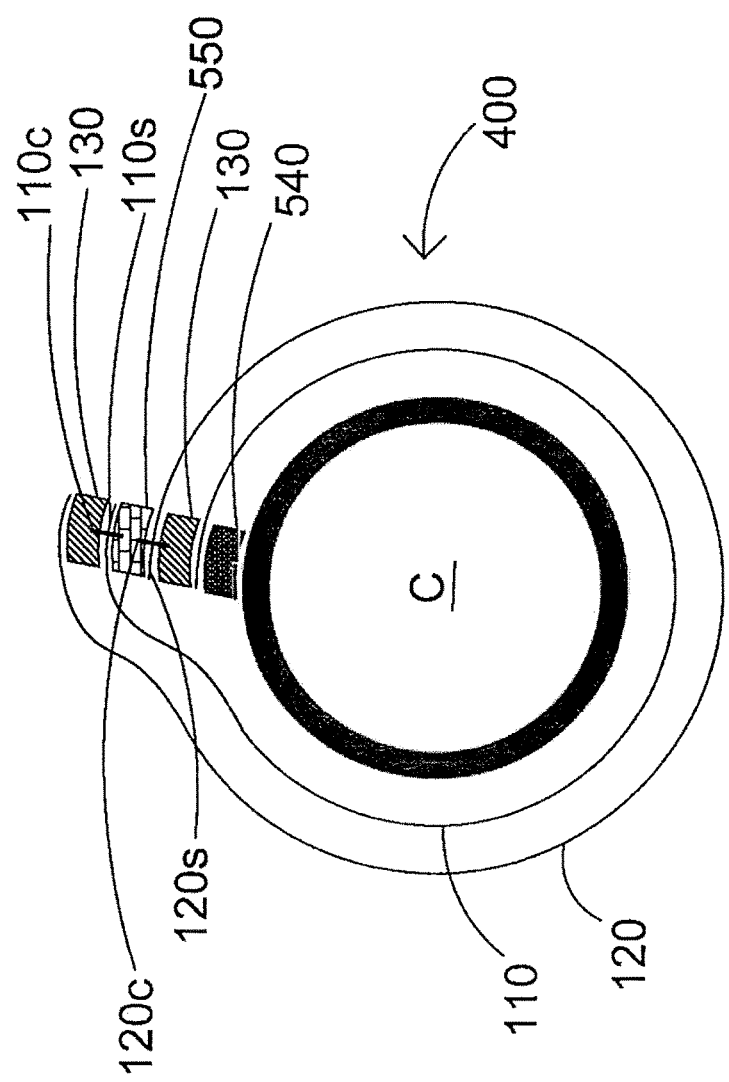
FIG. 5 is a schematic top view of an example of the label of FIG. 4, adhered to a container.

In FIG. 5, the example of the individual label 400 of FIG. 4 is schematically depicted in a top view as having been applied to a container C by a label application machine (again, not illustrated) as aforementioned. In this example, in conventional roll-fed label application fashion, an adhesive material 540 is supplied at point of application—typically by the label application machine itself—to a selected portion of base ply 110 of label 400, or to a selected portion of an outer surface of container C. Ply 110, and thus label 400, is thereby adhered at its first or "leading" end to container C by the label application machine. As aforedescribed regarding labeling machines, base ply 110—and thus label 400—is then placed in circumferential fashion around the container and secured at a second or "trailing" end of base ply 110 adjacent to its first end. As illustrated, in this example base ply 110 is secured by way of adhesive material 550 that is, similarly to adhesive material 540, supplied at point of application.

Figure 6:
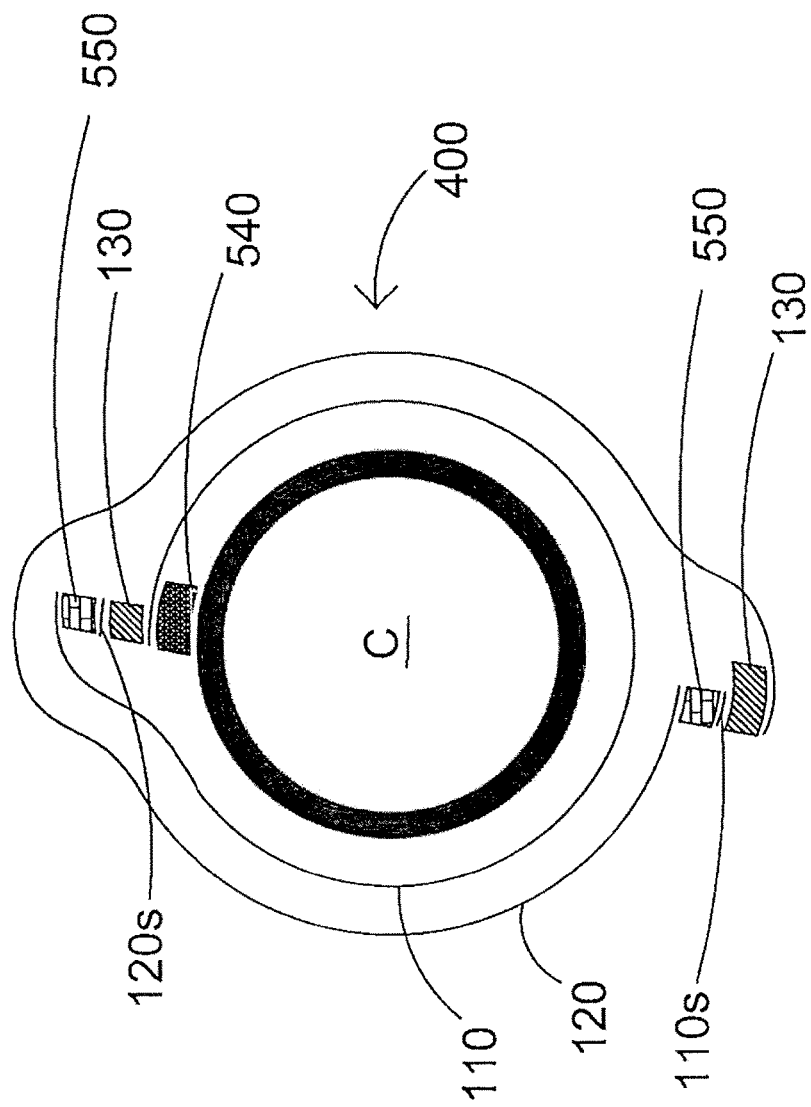
FIG. 6 is a schematic top view of an example of the label adhered to a container of FIG. 5, after having been manipulated by an end-user.

FIG. 6 schematically further depicts the example of the individual label 400 of FIG. 5, which was adhered to container C by a label application machine. In particular in FIG. 6, label 400 is depicted as having been manipulated by a consumer or end-user. Specifically in this example of FIG. 6, relative to the previous FIG. 5, top ply 120 has been manipulated such that top ply 120 has been shifted by approximately 180 degrees around container C. It is to be appreciated and understood that the label plies, by way of the aforedescribed novel and inventive construction of the label web and individual labels—including portions 110S and 120S of the plies—are thereby configured to be manipulated by a consumer or end-user, to achieve a desired effect such as shifting in this example. In this regard, and with continued reference to FIGS. 5 and 6, it is to be appreciated and understood that a manipulation force applied to a ply—such as top ply 120 in this example—intentionally causes separation of top ply 120 and base ply 110 from their aforementioned portions 120S and 110S. Such separation of those portions thereby enables separation of the plies that had been bonded together during manufacturing and at point of application until so manipulated.

Although not illustrated herein, it is to be appreciated and understood that a label as described by example or otherwise contemplated herein could be so manipulated by a consumer or end-user to access information or graphics that could be made to visually appear upon shifting of a ply or plies. Additionally, although not illustrated, a label as described by example or otherwise contemplated herein could also include a so-called "microburst" feature whereby manipulation of the label by a consumer or end-user would cause activation of microburst particles for, e.g., release of a fragrance encapsulated within the microburst particles. In such a label, the microburst particles could, for example, be enclosed or contained between its plies. The particles could then be burst or activated upon separation of the plies by the consumer or end-user. Further, although again not illustrated, it is to be appreciated and understood that a label as described by example or otherwise contemplated herein could in addition to, or as an alternative to, the aforedescribed microburst feature, include a so-called "scratch and sniff" feature. In such an embodiment, the scratch and sniff feature could be provided by way of, for example, a scratch and sniff coating on any desired surface of one or more of the label's plies.

It is to be appreciated and understood that in a particular embodiment of a label pertaining to subject matter hereof, any areas or regions of the label defined by that label's height, length, or any combinations of its parameters, could be configured to be manipulated by a consumer or end-user to achieve a desired effect. Additionally, it is to be appreciated and understood that in a particular embodiment of a label pertaining to subject matter hereof, the label could have a plurality of separate portions that are configured to be manipulated by a consumer or end-user to achieve a desired effect such as, e.g., a plurality of "viewing ports" or "visual access regions" for, e.g., accommodation and presentation of multi-lingual information.

Further, in a label as shown in FIG. 6, if base ply 110 and top ply 120 each have at least one suitably non-opaque, clear, or transparent portion, then manipulation of the label to put those portions of plies 110 and 120 into alignment with each other or into overlapping arrangement could result in a relatively clear view and visual observation of a level of a product within a suitably non-opaque, clear, or transparent container.

FIG. 7 is a schematic top view of another example of an individual label 700 produced according to subject matter hereof; and FIG. 7A is a schematic cross-sectional view of the label viewed along line 7A-7A in FIG. 7. In this example, a base ply 710 is selectively adhered or joined to a top ply 720 by way of, for example, suitable bonding agents or materials 730 and 740. As shown in the drawings, in this example top ply 720 is provided in separate components above base ply 710, whether abutting or separated by a slit (not illustrated) or by a relatively wider gap (as illustrated). It is to be appreciated and understood that the individual label 700 would be advantageously capable of being manipulated as aforedescribed. It is to be understood in FIG. 7 that bonding agents or materials 730 and 740 are, in this example, provided on an underside or bottom surface of top ply 720. Thus, although bonding agents or materials 730 and 740 are visible in the drawing, in a top view of an actual example of such a label the bonding agents or materials would typically not be visible; i.e., bonding agents or materials 730 and 740 have been visibly illustrated in FIG. 7 only to aid the viewer in understanding the general location of the bonding agents or materials with respect to an overall configuration of the label. Furthermore, in this example bonding agent or material 740 is illustrated as being in a cross-hatched pattern and distinct from bonding agent or material 730; but it is to be appreciated and understood that bonding agent or material 740 could be of a composition similar or identical to bonding agent 730 and could form a pattern, flood coat, or an intermittent or selected coat, or any suitable combinations thereof. Thus, regardless of a particular embodiment of label 700, it is to be further appreciated and understood that the bonding agents or materials could be, together or separately, of any suitable composition and/or form. Although not explicitly illustrated in FIG. 7, it is to be appreciated and understood that label 700 would, analogously to label 400 of FIG. 4, also include suitable cuts located (i) where bonding agent or material 730 resides between the plies and (ii) between edges of the plies.

FIG. 8 is a schematic top view of another example of an individual label 800 produced according to subject matter hereof; and FIG. 8A is a schematic cross-sectional view of the label viewed along line 8A-8A in FIG. 8. In this example, a base ply 810 is selectively adhered or joined to a top ply 820 by way of, for example, a suitable bonding agent or material 830. As shown in the drawing, in this example top ply 820 is provided in a widthwise dimension that is intentionally dissimilar to that of base ply 810. It is to be appreciated and understood that the individual label 800 would be advantageously capable of being manipulated as aforedescribed. It is to be understood in FIG. 8 that bonding agent or material 830 is, in this example, provided on an underside or bottom surface of top ply 820. Thus, although bonding agent or material 830 is visible in the drawing, in a top view of an actual example of such a label bonding agent or material 830 would typically not be visible; i.e., bonding agent or material 830 has been visibly illustrated in FIG. 8 only to aid the viewer in understanding the general location of the bonding agent or material with respect to an overall configuration of the label. Although not explicitly illustrated in FIG. 8, it is to be appreciated and understood that label 800 would, analogously to label 400 of FIG. 4, also include suitable cuts located (i) where bonding agent or material 830 resides between the plies and (ii) between edges of the plies.

Figure 9:
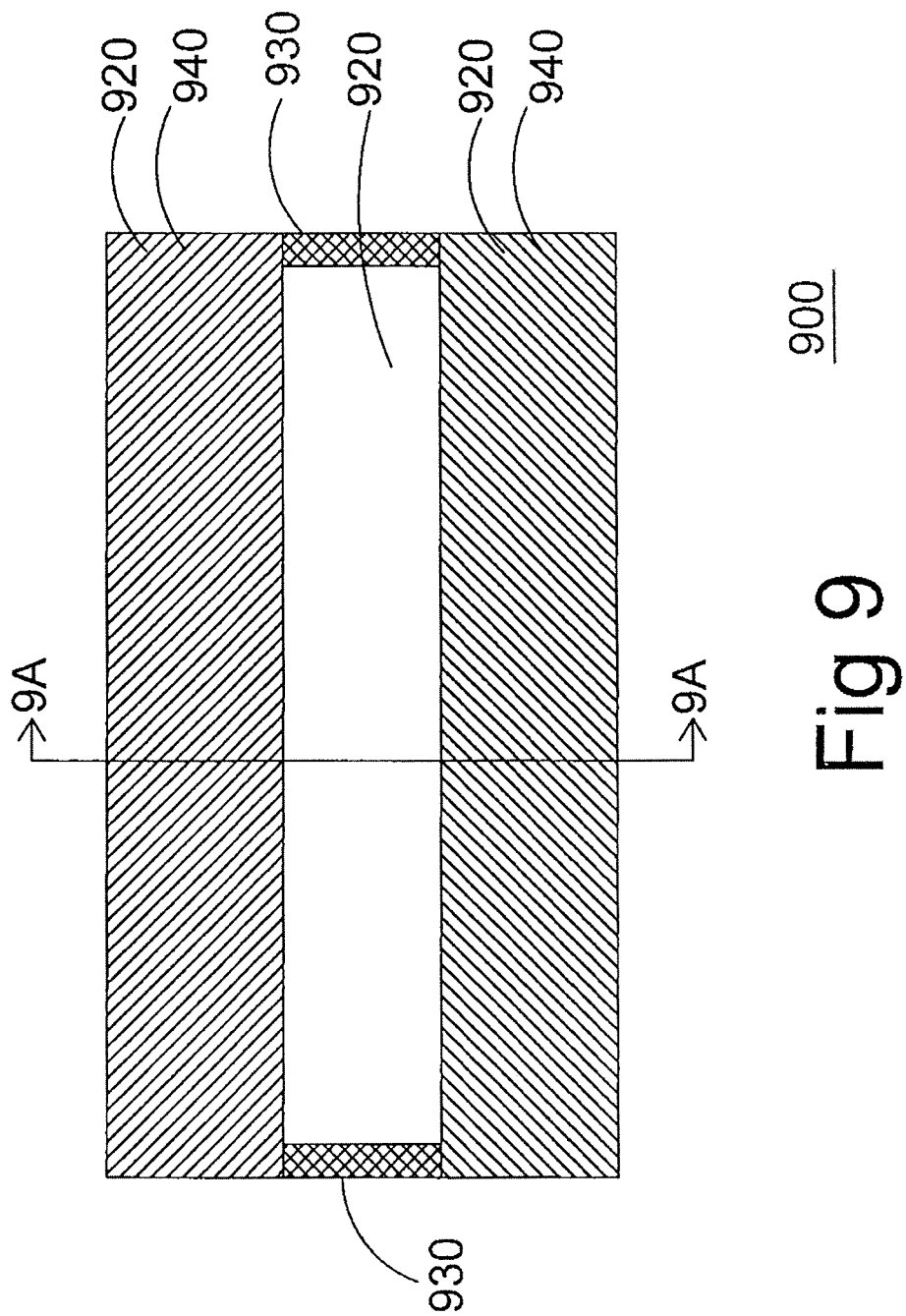
FIG. 9 is a schematic top view of another example of an individual label produced according to subject matter hereof.

FIG. 9 is a schematic top view of another example of an individual label 900 produced according to subject matter hereof; and FIG. 9A is a schematic cross-sectional view of the label viewed along line 9A-9A in FIG. 9. In this example, a base ply 910 is selectively adhered or joined to a top ply 920 by way of, for example, suitable bonding agents or materials 930 and 940. As shown in the drawings, in this example top ply 920 is provided in a plurality of separate components above base ply 910, whether abutting or separated by slits (not illustrated) or by relatively wider gaps (as illustrated). It is to be appreciated and understood that the individual label 900 would be advantageously capable of being manipulated as aforedescribed. It is to be understood in FIG. 9 that bonding agents or materials 930 and 940 are, in this example, provided on an underside or bottom surface of top ply 920. Thus, although bonding agents or materials 930 and 940 are visible in the drawing, in a top view of an actual example of such a label the bonding agents or materials would typically not be visible; i.e., bonding agents or materials 930 and 940 have been visibly illustrated in FIG. 9 only to aid the viewer in understanding the general location of the bonding agents or materials with respect to an overall configuration of the label. Furthermore, in this example bonding agent or material 940 is illustrated as being in a cross-hatched pattern and distinct from bonding agent or material 930; but it is to be appreciated and understood that bonding agent or material 940 could be of a composition similar or identical to bonding agent 930 and could form a pattern, flood coat, or an intermittent or selected coat, or any suitable combinations thereof. Thus, regardless of a particular embodiment of label 900, it is to be further appreciated and understood that the bonding agents or materials could be, together or separately, of any suitable composition and/or form. Although not explicitly illustrated in FIG. 9, it is to be appreciated and understood that label 900 would, analogously to label 400 of FIG. 4, also include suitable cuts located (i) where bonding agent or material 930 resides between the plies and (ii) between edges of the plies.

The examples of labels 700, 800, and 900 comprise so-called "roll-fed" label constructions, analogous to labels produced from the aforedescribed example of web 100. Also as aforedescribed, although this disclosure primarily describes roll-fed label constructions, it is to be appreciated and understood that so-called "cut-and-stack" label constructions might be successfully utilized by employing "cut-and-stack" manufacturing and application processes that would not require modification to such application equipment, analogously to those previously described by example herein.

FIG. 10 is a schematic illustration of an example of a tool 1000 provided by a label according to subject matter hereof. Tool 1000 could, for example, be provided by the examples of labels 700 and 800. In this example, tool 1000 comprises a numerical conversion scale, that would be operable by way of, for example, circumferential shifting of a ply—or shifting of plies relative to each other.

Regardless of a particular embodiment, it is to be appreciated and understood that labels and their manufacturing methods, as have been described by example or otherwise contemplated herein, can advantageously utilize label manufacturing bonding agent or materials and label application adhesives such as those that typically are, presently, used and commercially available for manufacturing of roll-fed labels and subsequent application of the roll-fed labels to objects to be labeled at point of application. It is to be noted that such labels may have, in their initial conditions upon application to objects to be labeled, visual characteristics of traditional roll-fed labels, whether single-ply or multi-ply. Furthermore, labels and their manufacturing methods—as have been described by example or otherwise contemplated herein—may also advantageously utilize existing and commercially available or industry-standard label manufacturing and label application equipment generally. For example, web and label ply cutting heads, devices, and methods, along with machine speeds, etc., may remain unchanged and not require any significant modifications.

It is generally also to be appreciated and understood that certain embodiments of a label according to subject matter hereof, as described by example or otherwise contemplated herein, could have particularly utility in labeling objects or containers that have a regular shape, which may be cylindrical, or another shape, which is of constant circumference from top to bottom. Other objects or containers, however, may have coved or rounded top and bottom shoulder-type tapers which, it is to be understood, also could be accommodated by a particular embodiment of a label according to subject matter hereof.

While this disclosure has been particularly shown and described with reference to accompanying figures, it will be understood, however, that modifications are possible. It should be appreciated that various components described herein may be substituted for other suitable components for achieving desired results, or that various accessories may be added thereto. Thus, for example, bonding agents or materials, and coatings—that have been described by example or are otherwise contemplated herein—could be provided in flood coats as aforementioned, or in any portions or patterns, or in any suitable combinations thereof. Also, bonding agents or materials could alternatively be provided on back surfaces of the top plies as well as the front surfaces of the base plies, or both. Any suitable combinations of bonding agents or materials and/or coatings may be utilized provided that they enable satisfactory manipulation of the labels as aforedescribed by example.

It is to be understood that any suitable alternatives may be employed to provide labels according to subject matter hereof. Thus, for example, depictions of various containers in the figures are only exemplary and not meant to be limiting.

Lastly, the choice of compositions, sizes, and strengths of various components described herein are to be selected depending upon intended use and/or performance.

Accordingly, these and other various changes or modifications in form and detail may be made to labels according to subject matter hereof, without departing from the true spirit and scope thereof.

What is claimed is:

1. A label constructed from a roll-fed label web, comprising:
   a base ply of a roll-fed label web that is selectively joined to a top ply of a roll-fed label web by way of a bonding agent in selected locations between the plies, wherein neither the roll-fed label web of the base ply nor the roll-fed label web of the top ply are of a pressure-sensitive adhesive web construction;
   cuts through the top ply and cuts through the base ply, the cuts being located where the bonding agent resides between the plies and in separate locations laterally along the plies such that a cut through the top ply does not align with a cut in the base ply;
   sequential cuts at point of application, together through both the top ply and the base ply and the bonding agent, the sequential cuts being located where the bonding, agent resides between the plies and in separate locations laterally along the plies such that the sequential cuts do not align with cuts in the top ply or with cuts in the base ply;
   and portions of the top ply and portions of the base ply that (i) are each defined by respective cuts in the top ply and base ply and (ii) remain adhered to an overall structure of the roll-fed label web,
   wherein the label, that is produced from the roll-fed label web at point of application, may be manipulated to achieve a desired effect, and
   wherein the roll-fed label web includes a base ply having a front surface that is capable of bearing graphic images and coatings and a back surface that is capable of bearing graphic images and coatings, with the back surface being free of adhesive material, the base ply further being configured to be subsequently coupled to objects to be labelled, after the roll-fed label web is manufactured, by separately supplied adhesive material from a roll-fed label web application machine when the roll-fed label web is then introduced to the application machine that then cuts the web into individual labels for application to the objects to be labeled using the separately supplied adhesive material at point of application.

2. The label of claim 1, wherein the desired effect includes shifting of a selected ply circumferentially around a container to which the label is applied.

* * * * *